United States Patent [19]

Yan et al.

[11] Patent Number: 4,533,463
[45] Date of Patent: Aug. 6, 1985

[54] CONTINUOUS COKING OF RESIDUAL OIL AND PRODUCTION OF GASEOUS FUEL AND SMOKELESS SOLID FUELS FROM COAL

[75] Inventors: Tsoung Y. Yan, Philadelphia, Pa.; Darrell D. Whitehurst, Titusville, N.J.

[73] Assignee: Mobil Oil Corporation, New York, N.Y.

[21] Appl. No.: 512,505

[22] Filed: Jul. 11, 1983

[51] Int. Cl.³ ........................... C10G 9/28; C10G 9/32
[52] U.S. Cl. ..................... 208/127; 208/8 R; 208/251 R; 48/200; 48/201; 48/206; 48/210; 201/23; 201/28; 201/31; 201/38
[58] Field of Search ............ 208/8 R, 127, 251 R; 48/197 R, 200, 206, 210, 201; 201/23, 28, 31, 38

[56] References Cited

U.S. PATENT DOCUMENTS

| | | | |
|---|---|---|---|
| 2,953,517 | 9/1960 | Whitely et al. | 208/127 |
| 3,113,985 | 12/1963 | Metrailer | 208/127 |
| 3,259,565 | 7/1966 | Kimberlin, Jr. | 208/127 |
| 3,260,664 | 7/1966 | Metrailer | 208/127 |
| 3,565,756 | 2/1971 | Eddinger et al. | 208/127 |
| 3,607,156 | 9/1971 | Schlinger et al. | 48/200 |
| 3,620,698 | 11/1971 | Schlinger et al. | 48/200 |
| 3,661,767 | 5/1972 | Wirth et al. | 208/127 |
| 3,684,689 | 8/1972 | Patton et al. | 208/127 |
| 3,963,426 | 6/1976 | Hand | 48/206 |
| 4,113,602 | 9/1978 | Gorbaty et al. | 208/127 |
| 4,218,287 | 8/1980 | Albright et al. | 208/127 |
| 4,317,711 | 3/1982 | Yan | 208/8 LE |
| 4,358,290 | 11/1982 | Chen et al. | 208/127 |
| 4,390,409 | 6/1983 | Audeh | 208/251 R |

FOREIGN PATENT DOCUMENTS

| | | | |
|---|---|---|---|
| 537774 | 3/1957 | Canada | 208/127 |
| 2634670 | 2/1978 | Fed. Rep. of Germany | 48/200 |

Primary Examiner—D. E. Gantz
Assistant Examiner—Helane Myers
Attorney, Agent, or Firm—Alexander J. McKillop; Michael G. Gilman; Charles J. Speciale

[57] ABSTRACT

Coal and residual oil are simultaneously processed in a reactor with a combustion zone at the bottom and a fluidized bed on top of it. The residual oil is injected into heat exchange relationship with the top of the fluidized bed where it is cracked with heat generated by the combustion.

8 Claims, 1 Drawing Figure

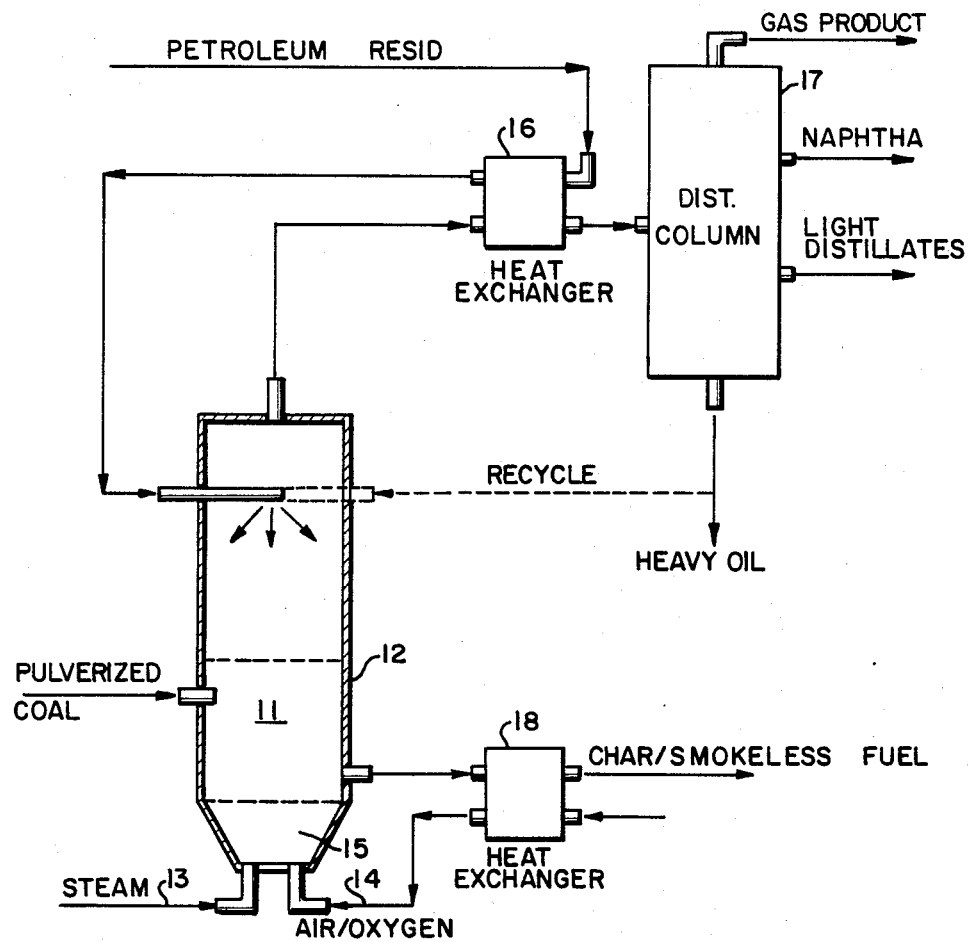

//4,533,463//

CONTINUOUS COKING OF RESIDUAL OIL AND PRODUCTION OF GASEOUS FUEL AND SMOKELESS SOLID FUELS FROM COAL

BACKGROUND OF THE INVENTION

This invention relates to the simultaneous processing of a liquid carbonaceous feed stream and particulated carbonaceous fuel.

Residual petroleum oil fractions produced by atmospheric or vacuum distillation of crude petroleum are characterized by a relatively high metals content. This occurs because substantially all of the metals present in the original crude remain in the residual fraction. Principal metal contaminants are nickel and vanadium, with iron and small amounts of copper sometimes being present.

The high metals content of the residual fractions generally preclude their effective use as chargestocks for subsequent catalytic processing, such as catalytic cracking and hydrocracking, because the metal contaminants deposit on the special catalysts for these processes and cause the formation of inordinate amounts of coke, dry gas, and hydrogen.

It is current practice to upgrade certain residual fractions by a pyrolytic operation known as coking. In this operation the residuum is destructively distilled to produce distillates of low metals content and leave behind a solid coke fraction that contains most of the metals. Coking is typically carried out in a reactor or drum operated at about 800°-1100° F. temperature and a pressure of 1-10 atmospheres. The economic value of the coke byproduct is determined by its quality, particularly its sulfur and metals content. Excessively high levels of these contaminants make the coke useful only as low-valued fuel. In contrast, cokes of low metals content, for example up to about 100 ppm (parts per million by weight) of nickel and vanadium and containing less than about 2 wt.% sulfur, may be used in high valued metallurgical, electrical, and mechanical applications.

Typical coking processes are shown in "PETROLEUM PROCESSING—PRINCIPLES AND APPLICATIONS", R. J. Hengstbeck, McGraw Hill Book Co., Inc., 1959, p. 138. Delayed coking is a batch process which is expensive to operate because of its high labor intensity. The liquid yield is not as high as it could be due to excessive secondary cracking. Fluid coking is a continuous process. The liquid yield is higher but it produces coke of low value. Transferring coke between the burner and the reactor is expensive.

As petroleum resources become increasingly scarce, conversion of coal into gas and liquid fuels becomes increasingly necessary. Currently many such processes are at various stages of development. Unfortunately, the processes are all expensive, mainly due to their high investment costs. The current challenge in process development is to lower the investment cost.

From coal, substantial amounts of gas and liquid fuels can be obtained by pyrolysis and partial gasification. FIGS. 20.52, 24.14, 24.33, 24.37, 24.38, 24.39 of "Chemistry of Coal Utilization," National Research Council Committee on Chemical Utilization of Coal, H. H. Lowry, Chairman and Editor, New York, Wiley, 1945 show typical reactors for gasification of coal including the synthane gasifier, the Battelle-Union Carbide gasifier, the British Gas-Lurgi slagging gasifier, the U.S. Bureau of Mines three-stage coal gasifier-combustor, and the West Virginia University pyrolizer/gasifier. However, most coals are not environmentally acceptable for direct use as fuel for small furnaces. High sulfur content of coal leads to $SO_2$ formation and soot formation caused by coal devolatization during combustion.

U.S. Pat. No. 4,317,711-Yan describes a method for co-processing residual oil and coal by visbreaking a slurry of heavy hydrocarbon oil and finally divided coal. The visbroken mixture yields a demetalized liquid hydrocarbon product.

RELATED APPLICATIONS

"COAL AS LIQUID FUEL EXTENDER FOR PROCESS HEATERS", Ser. No. 346,436, filed Feb. 8, 1982, Yan, describes a process in which a slurry of oil and residual oil is visbroken to yield liquid product which is suitable for use in process heaters and solid fuel which is suitable for use in solid fuel furnaces.

It is an object of the present invention to provide a continuous coker which improves coking efficiency and reduces operation costs.

It is another object to produce clean gaseous fuel and smokeless solid fuel from coal.

It is another object of this invention to co-process residual oil and coal to take advantage of the synergistic effects of such co-processing.

It is a further object of the present invention to increase the liquid yield of residual oil coking.

SUMMARY OF THE INVENTION

In accordance with the present invention, residual oil and particulated coal are simultaneously co-processed in a reactor wherein devolatized coal, or char, is burned in a combustion zone and residual oil is injected into heat exchange relationship with the top of a fluidized bed where it is cracked. Gas and liquid products are recovered in the form of vapor from the top of the reactor. Smokeless fuel is recovered from the underflow of the fluidized bed as char. Liquid fuel is produced both from the cracked residual oil and from the pyrolysis of coal. The char which is produced in the underflow is low in sulfur content and has excellent combustion characteristics which are distinctly better than conventional fluid coke. In this manner, an improved yield of better grade liquid and solid fuel is obtained than has been obtained from conventional coking of residual oil or conventional coal gasification processes.

The foregoing and other objects, features and advantages of the invention will be better understood from the following more detailed description and appended claims.

SHORT DESCRIPTION OF THE DRAWING

The single sheet of drawing shows a reactor which processes residual oil and coal simultaneously to obtain high yield of liquid and solid smokeless fuel of low sulfur content.

DESCRIPTION OF THE PREFERRED EMBODIMENT

Coal or other solid carbonaceous material is reduced to a particle size of preferably about 40-200 mesh in a pulverizer (not shown). The coal is preheated and continuously fed to the top of fluidized combustion bed 11 in the bottom of reactor 12.

Steam and air (or oxygen) are fed to the reactor via conduits 13 and 14. Combustion occurs in the combustion zone 15. If no coal partial oxidation is desired the quantity of air is controlled so that the combustion generates exactly the heat required in the process. However, when partial gasification of coal to gaseous fuel is desired, additional air/steam corresponding to the amount required for gasification has to be added. The combustion zone 15 is preferably maintained between 1400°–2000° F. The combustion of coal required to achieve heat balance is typically equivalent to about 2–10% of the residual oil in heat content. In order to achieve substantial desulfurization of the coal, partial gasification of 10–40% of coal is desired. The temperature is maintained by using super heated steam although heat also can be provided by the addition of the oxygen. The pressure of the reactor can be from −10 to 1000 psig. However, for maximizing liquid yield, pressure range of 0 to 50 psig is preferred. The amount of steam introduced will generally be in the range of 0.1 to 0.5 lbs. per pound of coal. The steam temperature is conveniently between 800° F. and 1200° F. and the pressure is substantially that of the reactor pressure.

Residual oil is supplied through heat exchanger 16 to the top of reactor 12, where it contacts the top of the fluidized bed 11 for rapid heat exchange. The preferred feed injection is in a form of spray to ensure uniform distribution across the reactor and maximum contact with the rising vapor and gases.

The gas and liquid products are recovered in the form of vapor from the top of the reactor. The overhead effluent is cooled by heat exchanger 16 and fractionated in a distillation column 17 to recover the liquid product. This heat exchange can be either direct or indirect. The gaseous overhead is further processed in the gas plant.

The smokeless fuel is recovered from the overflow of the fluidized bed as char. The char passes through heat exchanger 18 where it heats incoming air or oxygen.

The ratio of coal to resid can be varied according to the product needs and in the range of 0.05 to 10. At the low coal to resid ratio, the process is more like a continuous coker with in situ heat generation. At the high ratio of coal to resid, the process becomes a partial gasifier.

In the reactor, steam and carbon are converted to carbon monoxide and hydrogen by the water gas reaction. Carbon dioxide and methane also appear in the product gases. At the temperatures and pressures prescribed, partial gasification, approximately 5 to 50 percent of the feed coal, is achieved if a proper amount of air/stream is added. Residence time of the reactants should be less than 30 minutes and preferably less than 20 minutes.

The solid product of the reaction is a low sulfur partially gasified char which is withdrawn from the lower portion of the reactor.

Liquid carbonaceous materials other than residual oil can be used. Preferred residual liquids should have a Conradson carbon content of 5 wt.% or more. Suitable liquid carbonaceous materials for use in the present invention include heavy hydrocarbon oils, tar sand oil, heavy and reduced petroleum crudes, atmospheric residua, pitch, asphalt, bitumen, shale oil, other heavy hydrocarbon residues and liquid products derived fom extraneous coal liquification processes.

All ranks of coal, peat, sub-bitumunous and bitumunous coal, can be used. Other carbonaceous solids such as biomass, wood, paper, fiber or used tires can also be used. At low resid feed rates, a high yield of liquid and gas is desired, and coal of high volatility is preferred. In order to produce high quality smokeless fuel, low sulfur and low ash coal is preferred though 50–80% of the sulfur in the coal is easily removed by this process. Rapid pyrolysis in the process produces char of high surface areas and excellent combustion characteristics which is distinctly different from the conventional fluid coke.

The vaporous products include gaseous hydrocarbons and normally liquid hydrocarbons as well as other gases which were introduced into the reactor as fluidizing gas. The vapor phase product is removed from the coker by line 12 for scrubbing and fractionation in a conventional way. If it is desired, at least a portion of the vaporized effluent can be recycled to the coker as fluidizing gas. A stream of heavy material condensed from the vaporous coker effluent may be recycled to the coker or the coker may be operated in a once-through manner, that is, without recycle of the heavy material to the coker.

Reactors of the type previously mentioned may be modified for use in carrying out the process of this invention.

While a particular embodiment of the invention has been shown and described, various modifications are within the true spirit and scope of the invention. The appended claims are, therefore, intended to cover all such modifications.

What is claimed is:

1. A method of simultaneously processing residual oil and coal to produce liquid and solid smokeless fuel comprising:
   burning devolatized coal or char in a combustion zone maintained at a temperature between 1400°–2000° F. in the bottom of a reactor maintained at a pressure in the range of 0–50 psig;
   fluidizing char and coal with gas rising from said combustion zone;
   injecting residual oil into heat exchange relationship with the top of the fluidized bed of char and coal;
   recovering overhead effluent to produce said liquid fuel;
   removing char from said fluidized bed to produce solid fuel; and
   controlling the air fed to said combustion zone to an amount which generates the requisite heat for coking said residual oil, but limited to an amount required for partial gasification of 10–40% of said coal, substantial desulfurization of said coal, and production of said solid fuel.

2. The method recited in claim 1 further comprising: feeding pulverized coal to the top of said fluidized bed.

3. The method recited in claim 1 further comprising: feeding steam and air to the bottom of said combustion zone.

4. The method recited in claim 3 wherein the quantity of steam is controlled to maintain said char and coal in a fluidized state in conjunction with flue gas formed during combustion.

5. The method recited in claim 1 wherein said residual oil is injected in the form of a spray.

6. The method recited in claim 1 further comprising: cooling said overhead effluent to produce gas and liquid products.

7. The method recited in claim 6 further comprising: fractionating the cooled overhead effluent in a distillation column to produce said liquid fuel.

8. The method recited in claim 1 wherein the ratio of coal to residual oil is in the range of 0.05 to 10.

* * * * *